United States Patent [19]

Sieckert et al.

[11] 4,077,434
[45] Mar. 7, 1978

[54] SEALED LAY-IN CONDUIT DUCT

[75] Inventors: Edgar W. Sieckert, Princeton; Robert D. Frayseth, Minneapolis; John R. Breckenridge, Anoka, all of Minn.

[73] Assignee: Federal Cartridge Corporation, Minneapolis, Minn.

[21] Appl. No.: 690,512

[22] Filed: May 27, 1976

[51] Int. Cl.² ............................................. F16L 9/22
[52] U.S. Cl. ................................... 138/92; 138/155; 138/156; 138/158; 138/164; 174/68 C; 174/101; 285/121; 285/DIG. 22
[58] Field of Search .............. 138/155, 156, 158, 164, 138/92; 174/68 C, 101; 285/31, 121, DIG. 22

[56] References Cited

U.S. PATENT DOCUMENTS

| | | | |
|---|---|---|---|
| 2,917,083 | 12/1959 | DuVall et al. | 174/68 C X |
| 3,070,689 | 12/1962 | McIntosh | 174/68 C X |
| 3,312,251 | 4/1967 | Marks et al. | 174/68 C |
| 3,338,599 | 8/1967 | Hallman | 174/68 C |
| 3,351,699 | 11/1967 | Merckle | 174/68 C |
| 3,370,121 | 2/1968 | Merckle | 138/164 X |
| 3,401,721 | 9/1968 | George | 138/159 X |
| 3,570,546 | 3/1971 | Jackson | 138/155 |
| 3,633,628 | 1/1972 | Duquette et al. | 174/68 C X |
| 3,636,984 | 1/1972 | Rauhauser | 138/155 |

Primary Examiner—Richard E. Aegerter
Assistant Examiner—James E. Bryant, III
Attorney, Agent, or Firm—Schroeder, Siegfried, Ryan Vidas & Steffey

[57] ABSTRACT

A sealed lay-in electrical conduit duct which is oil-tight and is comprised of U-shaped sealing collars which telescope into adjacent ends of aligned open ended sheet metal duct sections which are troughs generally U-shaped in cross-section and have their open sides unobstructed throughout their length and closable by a movable sealing trough cover. The sealing collars and duct sections have telescoping bottom and side wall portions, each of which carries elongated cooperating interengaging rib and groove elements which are aligned and extend normally to the longitudinal axis of the duct sections. Each collar member carries a sealing element extending throughout substantially its entire length which covers and seals the line of juncture of the adjacent ends of trough sections held in rigid aligned relation by the collar member. A closure member carrying sealing elements covers the open area between the ends of the side walls of each collar member and cooperates with the sealing trough covers to complete the seal of the duct in the areas adjacent the joined ends of the duct sections.

20 Claims, 9 Drawing Figures

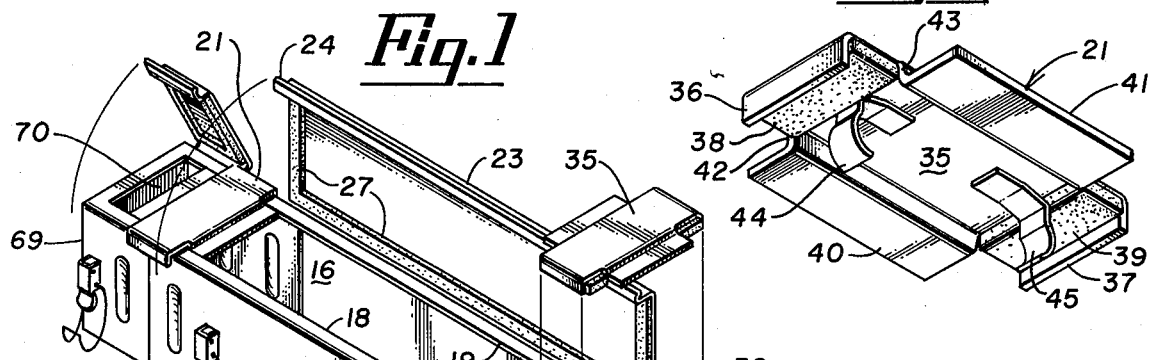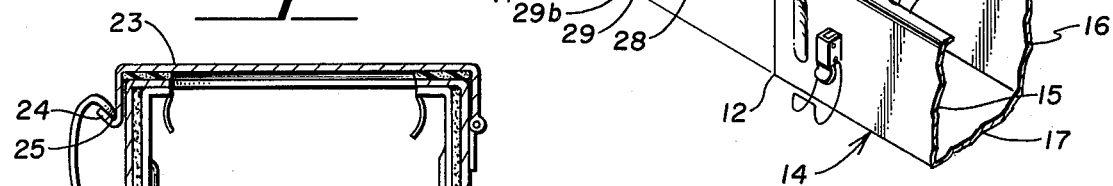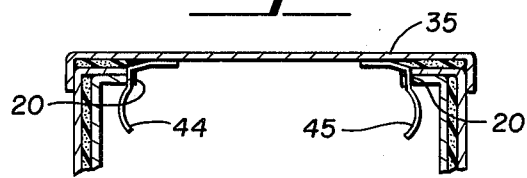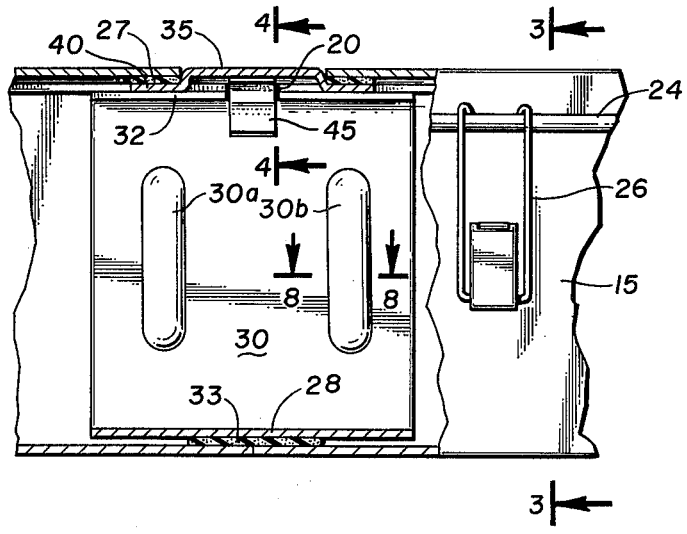

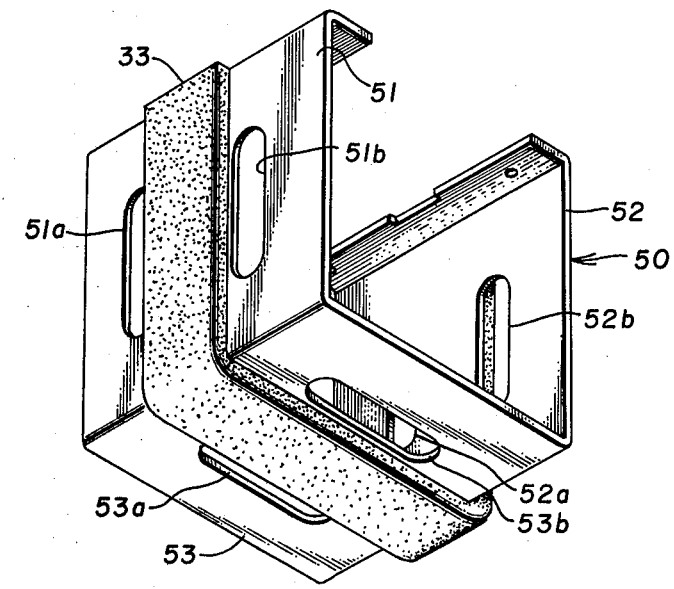
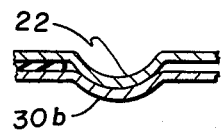
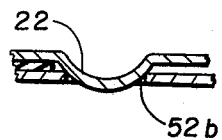
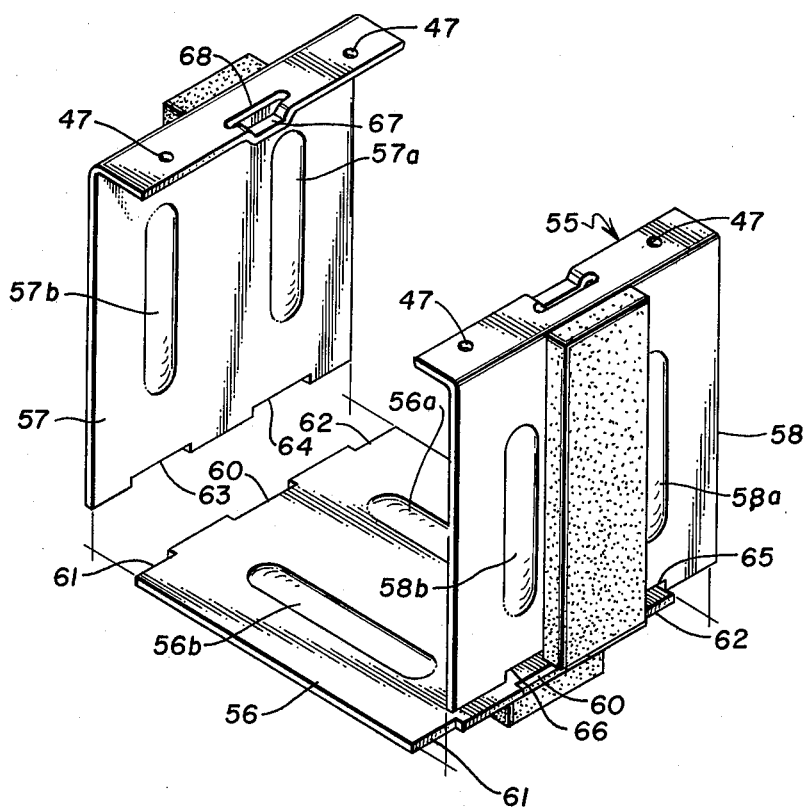

SEALED LAY-IN CONDUIT DUCT

It is a general object of our invention to provide a sectionalized electric conduit duct of the lay-in type which is sealed oil-tight and is of simple and inexpensive construction and assembly.

It is a more specific object of our invention to provide a novel lay-in electrical conduit duct which is completely oil-tight and is comprised of a plurality of relatively short sections which can be quickly, easily, and inexpensively connected in rigid, aligned, fixed and sealed relation.

Another object is to provide an oil-tight lay-in wireway which is designed to simplify and facilitate the rigid interconnection of two sections of troughs by the use of simple plates which snap into place and provide substantial labor savings during installation and present an improved streamlined appearance.

Another object is to provide a lay-in wireway which is oil-tight and which eliminates the need for outwardly extended connecting flanges secured together with bolts or the like by providing in lieu thereof simple snap-in connecting and sealing collars.

Another object is to provide an oil-tight lay-in wireway which utilizes a section connector which is simple and inexpensive in design, construction, and utilization and which, at the same time, provides an effective oil-tight seal throughout the wireway.

Another object is to provide a sectionalized oil-tight lay-in wireway, the sections of which are interconnected in rigid fixed aligned relation by a simple U-shaped sealing collar member which quickly, easily, and readily snaps into position to assemble the sections into a complete sealed oil-tight wireway.

These and other objects and advantages of our invention will more fully appear from the following description, made in connection with the accompanying drawings, wherein like reference characters refer to the same or similar parts throughout the several views, in which:

FIG. 1 is a pictorial view of a portion of a sealed conduit system illustrating a form of our invention and showing in exploded view the connecting collar in position in one end of a section of the duct;

FIG. 2 is a fragmentary elevation on an enlarged scale of the conduit of FIG. 1 assembled and with parts broken away;

FIG. 3 is a vertical cross-sectional view taken along line 3—3 of FIG. 2;

FIG. 4 is a sectional view taken along line 4—4 of FIG. 2;

FIG. 5 is a pictorial view of a member utilized in a second form of our invention;

FIG. 6 is a pictorial view of the closure member utilized in each of the three forms of our invention;

FIG. 7 is a pictorial view of the collar member used in the preferred form of our invention;

FIG. 8 is a fragmentary sectional view taken along line 8—8 of FIG. 2; and

FIG. 9 is a fragmentary sectional view corresponding to FIG. 8, but taken through a collar member of the type shown in FIG. 5.

One embodiment of our invention, as shown pictorially in FIG. 1 utilizes a generally U-shaped collar member 10 to connect adjacent end portions 11 and 12 of a plurality of trough or duct sections made of sheet metal and indicated generally as 13 and 14. As shown, each section is of the type which is generally U-shaped in cross-sectional configuration and are duplicates of each other. Each has side walls such as 15 and 16 and a bottom wall 17. Each such flange is cut away as at 20 at each end of the duct section to accommodate the closure member 21, which is best shown in FIGS. 1 and 6.

Each of the bottom walls 17 and side walls 15 and 16 is provided with an inwardly extending rib such as indicated by the numeral 22 in FIG. 1, which is located adjacent each end of the duct section. As shown, the three ribs are aligned along a plane extending normally to the longitudinal axis of the duct section.

Each duct section is also provided with a hinged cover member 23 which is hinged to one of the side walls and is swingable to close the open trough of the duct section. The cover member 23 is shown in open position in FIG. 1 and in closed position in FIG. 3. As shown, it is provided with an outwardly and upwardly directed flange 24 at its free edge which forms a trough 25 into which a pair of over-dead-center clamps 26 extend to draw the cover members into tightly closed position so as to compress the resilient and compressible sealing element 27 which is carried by the inner surface of the cover and extends continuously along its four side edges. This sealing element is preferably formed of an oil impervious and resistant material or some other suitable material, such as foamed oil resistant Neoprene.

The collar member shown in FIG. 1 is also made of sheet metal and is also generally U-shaped. As shown, it has a bight or bottom wall 28 and side walls 29 and 30. Extending inwardly at the free ends of each of these side walls is a flange 31, 32 which is adapted to snap into position beneath the duct section flanges 18 and 19 when the collar member is telescoped into one of the open ends of the duct section, as shown, and its one set of elongated grooves 28a, 29a and 30a are positioned to receive therein the duct section ribs 22, as shown. It will be readily appreciated that these grooves are formed in the outer surface of the collar member and are of a size adapted to snugly receive the ribs 22 therein and are positioned relative to each other so that when one of the ribs 22 is received in one of these grooves, the other ribs 22 will likewise be received in interengaging relation within the other two grooves.

As shown in FIG. 1, the collar member 10 is provided with a second set of inwardly extending grooves at its outer surface adapted to receive a similar set of ribs formed in the bottom and side walls of the adjacent end portion of an adjacent duct section. These grooves have been identified as 28b, 29b and 30b.

positioned between the two sets of grooves of the collar member 10 and extending continuously along the outer surface of the collar member from its one flange 31 to the other 32, is a seal element 33 which consists of a band of resilient compressible oil resistant material, such as that from which the sealing element 27 is formed. This sealing element 33 is compressed between the outer surface of the collar member 10 and the inner surface of the adjacent end portions 11 and 12 of the duct sections so that the line of juncture of the two duct sections are thereby sealed from flange 31 to flange 32. The resilience of the sheet metal from which the collar member 10 is formed is such that it springs back and maintains the sealing element under proper compression to provide the desired sealing function.

Once the collar member 10 has been positioned, as described above, so that the ribs of the inner surface of the bottom and side walls of the two duct sections are received within the grooves of the collar member, we have found that the two duct sections are held thereby in fixed rigid aligned relation. Of course, these interengaging ribs and grooves are so located that when so assembled, the ends of the two duct sections abut and are firmly held in such position. Likewise, the sealing element 33 extends along and covers the line of juncture of these two end portions 11 and 12 of the two duct sections 13 and 14. It will be noted that the area between the upper ends of the side walls of the duct sections and the collar member is unobstructed throughout their length.

The closure member 21 is comprised of a piece of sheet metal having a flat rectangular central area 35, at each end of which is a downwardly turned flange 36, 37. The length of the central area 35 is such that its flanges 36, 37 extend downwardly along the outer surface of the side walls 15, 16 of each duct section at its adjacent end portion, as illustrated in FIG. 1. Located just inwardly of the flange 36 is a rectangular shaped sealing element 38 which is secured to the underside of the closure member and each of which extends outwardly slightly beyond the side edges of the central area 35. A similarly shaped and sized sealing element 39 is located just inwardly of the flange 37 and is secured, as by adhesive, to the underside of the closure member and extends laterally outwardly beyond the flange.

At each of its sides, the closure member 21 carries a laterally extending sealing plate 40, 41 which is supported at a slightly depressed level relative to the central area 35 by a supporting shoulder 42, 43, respectively. These sealing plates extend transversely of the duct sections a distance equal to the spacing between the flanges 18 and 19 of the duct sections so that when the closure member 21 is applied thereto, these sealing plates will cooperate with the continuous seal element 27 of the cover member 23 to perfect an effective seal along the end edge of the cover member. The end edge of the cover member 23 extends along the supporting shoulder 42 or 43 and also compresses the outwardly protruding end of the seals 38 and 39 against the flanges 18 and 19 to complete the oil-tight seal for the duct section of that cover member 23 at that end. The cover member 23 of the adjacent duct section likewise compresses the protruding end portions of the seals 38 and 39 and bears against the other sealing plate to complete the oil seal for that adjacent duct section.

Secured to the underside of the central area 35 just inwardly of the seal elements 38 and 39 is a pair of spring clamps 44 and 45. These clamps extend outwardly and downwardly as shown and are adapted to snap into place within the slightly relieved area 20 which is formed at each end of the flanges 18 and 19 of each duct section. The adjacent relieved areas 20 of the two adjacent duct sections together define a rectangularly shaped keeper into which one of the clips 44 and 45 extend. These clips and relieved areas 20 preclude shifting movement of the closure member 21 longitudinally of the duct sections prior to closing of the cover members 23 and also retain the closure member in place during that period.

It will be noted that each of the flanges 18 and 19 adjacent each of its ends is provided with a downwardly struck and extending nipple 46 which is provided to extend downwardly into cooperating recesses or holes 47 which are formed in each end portion of each flange 31 and 32 of each collar member 10. When each collar member 10 is snapped into position as heretofore described with the ribs and grooves of the adjacent end portions of the duct sections and collar member 10 in mating relation, the nipples 46 extend into the openings 47 and secure the collar member 10 in that position. This further aids in securing the adjacent duct sections in fixed rigid aligned relation so that no other connecting means, such as bolts, need be provided. It will be also noted that the exterior surface of the duct is continuously smooth and has a neat streamlined appearance which is appealing to the eye. Most importantly, however, the interior of the duct is sealed off in oil-tight condition and the adjacent duct sections can be connected together in fixed rigid aligned relation with a minimum expenditure of time and effort and at a substantial saving.

A second embodiment of our invention involves the use of an almost identically constructed collar member 50, as shown in FIG. 5, which has side walls 51, 52 and a bottom wall 53. The only difference in this collar member is that aligned slots 51a, 52a and 53a are formed in one end portion of this collar member while aligned transverse slots 51b, 52b and 53b slots are formed in the other end portion. A sealing element, identical to that used on collar 10, is also provided and is identified accordingly with the numeral 33. It will be readily appreciated that this collar member 50 functions in the same manner as collar 10 with the ribs of each duct section extending into the slots of the collar member in interengaging relation to hold the ends of the two duct sections in abutting relation and seal the same with the sealing element 33. The closure member 21, likewise, is used in combination with the collar member 50 and the covers 23 of the duct sections to perfect the seal between these adjacent sections. Whenever hereinafter the term "grooves" is used, it is intended to include the slotted construction shown in this form of the invention for, of course, a slot is a mere extension of the formation of a groove to its ultimate degree.

The preferred form of our invention, as shown in FIG. 7, involves the use of a U-shaped collar member identified generally by the numeral 55. This collar is identical to that shown in FIG. 1 except that, as shown in FIG. 7, it is sectionalized into a bottom or bight section 56 and a pair of side wall sections 57 and 58. The inwardly extending groove members 56a, 57a and 58a, and 56b, 57b and 58b are formed identically to the grooves of the collar 10 but, of course, the sealing element 59 is also sectionalized although otherwise identical. In this connection, all of the sealing elements described herein are preferably of the material hereinbefore described.

As clearly shown in FIG. 7, the adjacent ends of the sections 56, 57 and 58 are cut in such a way as to be mating and interlock with each other. Thus, the bottom section 56 at each of its ends has a rectangular portion 60 cut away at its center line and its corner portions are relieved as at 61 and 62. The lower end portion of section 57 has a pair of rectangularly shaped relieved areas 63 and 64 which are of such size that the two adjacent end portions of the sections 56 and 57 interfit and mate in snug fitting relation when snapped into position within an end portion of a duct section so that the grooves register with and receive the ribs of the duct section therein and the nipples 46 are received within the openings 47.

The lower end portion of section 58 is relieved in identical manner to the lower end of section 57 to provide relieved areas 65 and 66 so that the lower end of section 58 will interfit and mate with the other end portion of section 56 when section 58 is snapped into position in the same manner as described above with respect to section 57. Once this has been accomplished, we have found that the collar member 55 holds the two adjacent sections of duct together in an equally rigid fixed aligned relation and, or course, has the advantage of greater ease of assembly and manufacture. It should be noted that the sections 56, 57 58 are preferably formed from slightly heavier gauge sheet metal than that utilized for collar members 10 and 50, preferably 14 gauge.

It will be noted that each of the flanges at the upper free ends of the side walls of each of the collars 10, 50 and 55 is depressed slightly at its central portion, as at 67, and that a slot 68 is formed at the outer end of that depressed portion. This is provided merely to aid in disassembly in the event such is desired. In that event, a flat ended screw driver can be slipped between the depressed area 67 and the flanges of the duct sections and into the slot 68, whereupon by lifting on the screw driver handle, the side wall of the collar member can be sprung free of the duct flanges which otherwise hold the collar members in place.

From the above, it can be seen that we have provided novel and highly improved means for securing adjacent lay-in duct suctions together in a fixed rigid interlocking relationship which at the same time provides a positive oil-tight seal through the duct. Moreover, our collar connectors are relatively simple and inexpensive to manufacture and to utilize for they can be readily snapped into place with a minimum expenditure of time and effort. In addition, the exterior appearance is greatly enhanced. It should be noted that a substantial savings in time and labor is accomplished through the use of our invention.

The ends of the lay-in wireway constructed in accordance with our invention can be sealed off through the use of a cap member 69, as shown at the left in FIG. 1. Such a cap member is formed just as any other section of duct except that it is shorter and the outer end portion is provided with a closed end wall 70 instead of being open and provided with aligned ribs in its side and bottom walls. It will be readily understood that angled open duct members may be provided with similar open ends and collar members with interengaging rib and groove elements, if such are needed.

It will, of course, be understood that various changes may be made in the form, details, arrangement and proportions of the parts without departing from the scope of our invention which consists of the matter shown and described herein and set forth in the appended claims.

What we claim is:

1. A sealed conduit system for electrical conductors including a plurality of duplicate open end sheet metal duct sections, each of said sections having a substantially U-shaped, imperforate trough body member with adjacent open end portions having abutting ends defining a line of juncture therebetween and a movable sealing trough cover, the open side of the U of each of said sections being unobstructed throughout the length of the section, connecting sealing collar members extending into and joining the adjacent end portions of said duct sections, said collar members having at least side and bottom walls, said side walls having free upper ends defining an opening therebetween, cooperative interengaging rib and groove elements carried by said walls of said collar members and the adjacent ends of said duct sections within which the said collar member extends and is disposed entirely, said elements cooperatively securing said duct sections together in rigid, fixed, aligned relation and extending transversely of the longitudinal axis of said sections, those of said elements which are carried by said trough body members defining an imperforate trough therewith an oil impervious seal member carried by each of said collar members and disposed between said side and bottom walls and the adjacent end portions of the said duct sections into which said collar member extends and extending along both sides of and over the entire line of juncture of the adjacent ends of said duct sections and sealing the same, and a cooperative sealing closure member positioned across the opening between the ends of said side wall of each of said collar members and cooperatively sealing off the adjacent ends of the covers of said adjacent duct sections to effectively and cooperatively seal each of the sections throughout their length and to each other.

2. The structure defined in claim 1 wherein said collar member constitutes the sole positive means for positively connecting said sections to each other.

3. The structure defined in claim 1 wherein said rib elements are formed in bottom and side wall portions of said duct sections in aligned relation adjacent the ends of said sections and said groove elements constitute aligned slots formed in the side and bottom walls of said collar members and receiving said rib elements therein and said elements cooperatively join the adjacent ends of said duct sections in fixed aligned relation.

4. The structure defined in claim 1 wherein said rib elements are formed in bottom and side wall portions of said duct sections in aligned relation adjacent the ends of said sections and said groove elements constitute aligned elongated recesses formed in the outer surfaces of said collar member side and bottom walls into which said rib elements extend to cooperatively join the adjacent ends of said duct sections in fixed aligned relation.

5. The structure defined in claim 1 wherein said seal member is compressed between said walls and said duct section end portions.

6. The structure defined in claim 1 wherein said side and bottom walls of said collar members are detachable relative to each other.

7. The structure defined in claim 1 wherein said side and bottom walls of said collar members are detachable relative to each other and have cooperative mating elements interconnecting the same.

8. The structure defined in claim 1 wherein said seal member is resilient and compressible.

9. The structure defined in claim 1 wherein each of said sections has side walls defining the open side of the U and each of said side walls has an outer end carrying an inwardly extending flange element adjacent the end portions of said section, each of the side walls of each of said collar members also carrying an inwardly extending flange element at its outer end, said flange elements of said collar member and said side wall of said duct section being adapted to cooperatively engage each other in nesting relation under pressure to effectively lock said collar member in duct section holding position.

10. The structure defined in claim 9 wherein said collar members are sectionalized.

11. The structure defined in claim 9 wherein said bottom and side walls of at least one of said collar members are detachable relative to each other.

12. The structure defined in claim 9 wherein said bottom and side walls of at least one of said collar members are detachable relative to each other and have mating and interlocking end portions.

13. The structure defined in claim 9 wherein said collar members are sectionalized and are made of sheet metal of approximately 14 gauge.

14. The structure defined in claim 1 wherein said collar members are made of resiliently deformable sheet metal.

15. The structure defined in claim 1 wherein said closure member and said movable cover member cooperatively seal off the interior of said duct sections.

16. The structure defined in claim 1 wherein said collar members are formed of resiliently deformable sheet metal and the free ends of the side walls thereof are sprung inwardly slightly toward each other to permit said collar member to be snapped into telescoping joining position relative to the adjacent end portions of said duct sections.

17. The structure defined in claim 1 wherein the cover of each of said duct sections has peripheral edges and includes a sealing element extending along each of said edges and said closure member is overlapped by the ends of the covers of said adjacent sections and has opposite sides and includes a sealing plate at each of said sides which is engaged by the sealing elements of its adjacent cover to perfect a seal therealong of the duct.

18. The structure defined in claim 9 wherein each of the covers of each of said duct sections includes a sealing element extending continuously along its interior periphery in position to engage said flange elements of said duct section along their length, said closure member having a sealing plate at each of its sides extending between the flange elements of said duct section and having a sealing element at each of its ends bearing against the adjacent end portions of the flange elements of the adjacent duct sections, each of said covers when closed having its said sealing element bearing down upon the upper surface of the adjacent sealing plate of said closure member and thereby causing said closure member to compress its said sealing elements at its ends against the flange element portions of the adjacent duct sections whereby a seal of the duct at the juncture of said duct sections is perfected.

19. In a sealed lay-in duct for conduit having end-abutting open end sheet metal duct sections, each of said sections having a substantially U-shaped, imperforate trough body with adjacent open end portions and a movable sealing trough cover, with the open side of the U unobstructed throughout the length of the section,
 a. a resiliently deformable connecting sealing collar member joining the adjacent ends of duct section in sealed relation;
 b. said connecting sealing collar member being also of sheet metal material and substantially U-shaped and having bight portions and resilient opposed side wall portions carried by said bight portions and flexing inwardly toward each other and relative to said bight portions when urged toward each other and extending in telescoping relation entirely within the adjacent end portions of adjacent trough sections;
 c. each of said telescoping trough end portions and bight and side wall collar portions having cooperative interengaging rib and groove elements arranged longitudinally of said collar member, said side wall portions being flexibly deformed inwardly toward each other under compression and said elements cooperatively rigidly securing said trough sections together in fixed aligned relation, those of said elements which are carried by said trough body members defining an imperforate trough therewith;
 d. an oil impervious seal member disposed between medial portions of said side wall and bight portions of said collar member, and said telescoping end portions of said sections opposite the abutting ends thereof and covering and sealing the same,
 e. and a cooperative oil impervious sealing closure member extending across the opening between the ends of said collar side wall portions and cooperatively sealing off the adjacent ends of the covers of said sections to effectively seal each of the sections throughout their length and to each other.

20. The structure defined in claim 19 wherein said collar member constitutes the sole positive means for positively connecting said sections to each other.

* * * * *